United States Patent [19]

Trousset et al.

[11] Patent Number: 5,218,534
[45] Date of Patent: Jun. 8, 1993

[54] METHOD OF COMPUTATION AND PROCESSING OF THE IMAGE IN CONICAL PROJECTION, OF A SAMPLED THREE-DIMENSIONAL OBJECT

[75] Inventors: Yves Trousset, Paris; Didier S. Felix, Boulogne; Anne Rougee, Fontenay aux Roses, all of France; Kenneth Hanson, Los Alamos, N. Mex.

[73] Assignee: General Electric CGR S.A., Issy les Moulineaux, France

[21] Appl. No.: 466,590

[22] Filed: Jan. 17, 1990

[30] Foreign Application Priority Data

Jan. 20, 1989 [FR] France .................... 89 00676

[51] Int. Cl.$^5$ ................. G06F 15/00; G06F 15/72
[52] U.S. Cl. .................... 364/413.17; 395/124
[58] Field of Search .............. 364/413.13, 414; 395/120, 124

[56] References Cited

U.S. PATENT DOCUMENTS

| 4,128,877 | 12/1978 | Katz | 354/414 |
|---|---|---|---|
| 4,630,203 | 12/1986 | Szirtes | 364/413.13 |
| 4,751,643 | 6/1988 | Lorensen et al. | 364/413.13 |
| 4,791,567 | 12/1988 | Cline et al. | 364/413.13 |
| 4,821,213 | 4/1989 | Cline et al. | 364/413.13 |
| 4,835,712 | 5/1989 | Drebin et al. | 395/124 |
| 4,952,922 | 8/1990 | Griffin et al. | 364/522 X |
| 4,989,142 | 1/1991 | Crawford | 364/413.13 |

FOREIGN PATENT DOCUMENTS 0234922 9/1987 European Pat. Off. .

OTHER PUBLICATIONS

Applied Optics, vol. 24, No. 23, Dec. 1, 1985, pp. 4028–4039, K. M. Hanson, et al., "Local Basis-Function Approach to Computed Tomography".
IEEE Transactions on Nuclear Science, vol. NS 25, No. 5, Oct. 1978, pp. 1135–1143, M. Schlindwein, "Interative Three-Dimensional Reconstruction from Twin-Cone Beam Projections".
Applied Optics, vol. 24, No. 23, Dec. 1985, Hanson & Wecksung, "Local Basis-Function Approach to Computed Tomography".

Primary Examiner—Gail O. Hayes
Assistant Examiner—Frantzy Poinvil
Attorney, Agent, or Firm—Nilles & Nilles

[57] ABSTRACT

In order to carry out a three-dimensional reconstruction of an object acquired by a series of conical projections on a two-dimensional multidetector, the object is estimated by a sampled function. The sampled function is projected and the projections of the sampled function are compared with the measurements resulting from acquisition on the 2D multidetector. A new estimation of the object is deduced therefrom and these operations are repeated until the comparison is satisfactory. In order to project, the sampled three-dimensional object is decomposed on a space of Gaussian basis functions. The contribution of the basis functions is computed for each image of the projection images, these contributions being equal to the integral of the product of the basis functions and of a support for illumination of the image element. It is shown that the choice of a Gaussian function as a function which is representative of the support makes it possible on the one hand to eliminate reconstruction artifacts and on the other hand to increase the speed of computation of reconstruction as a result of simplification of the reconstruction computations which this choice entails.

10 Claims, 2 Drawing Sheets

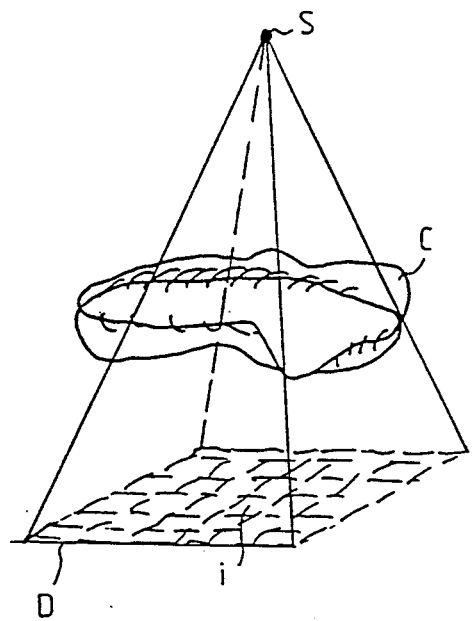
FIG_1
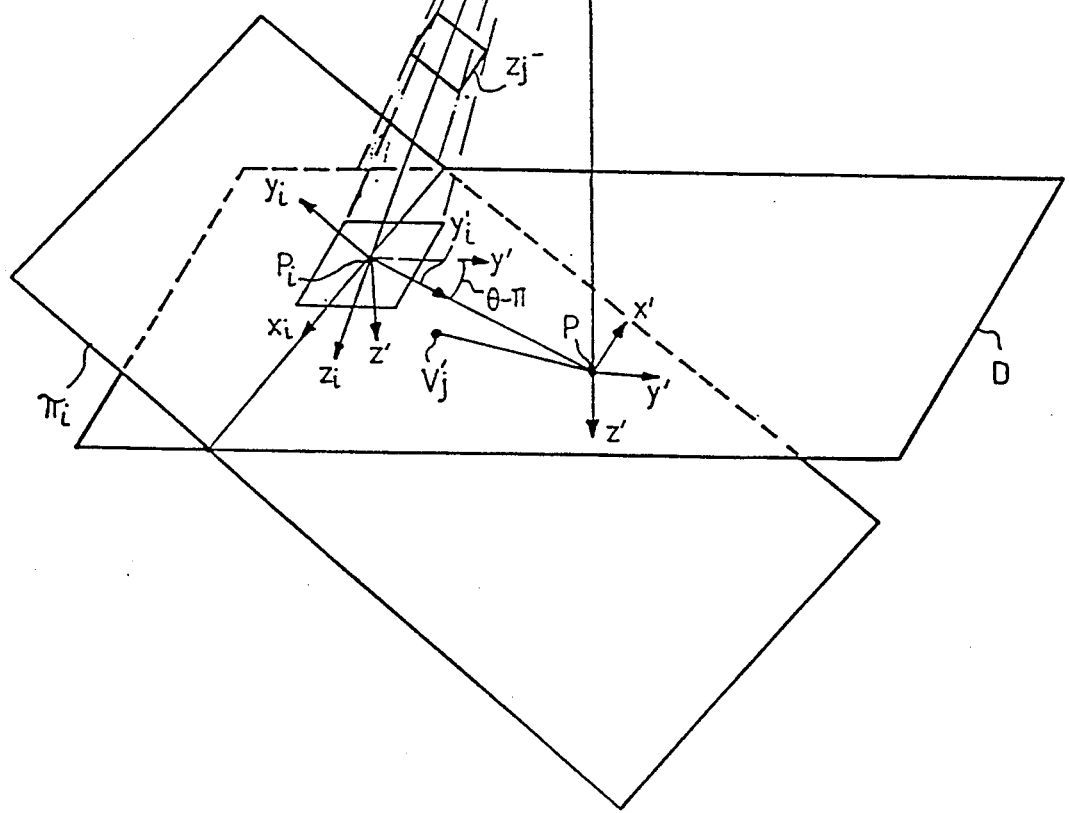
FIG_2

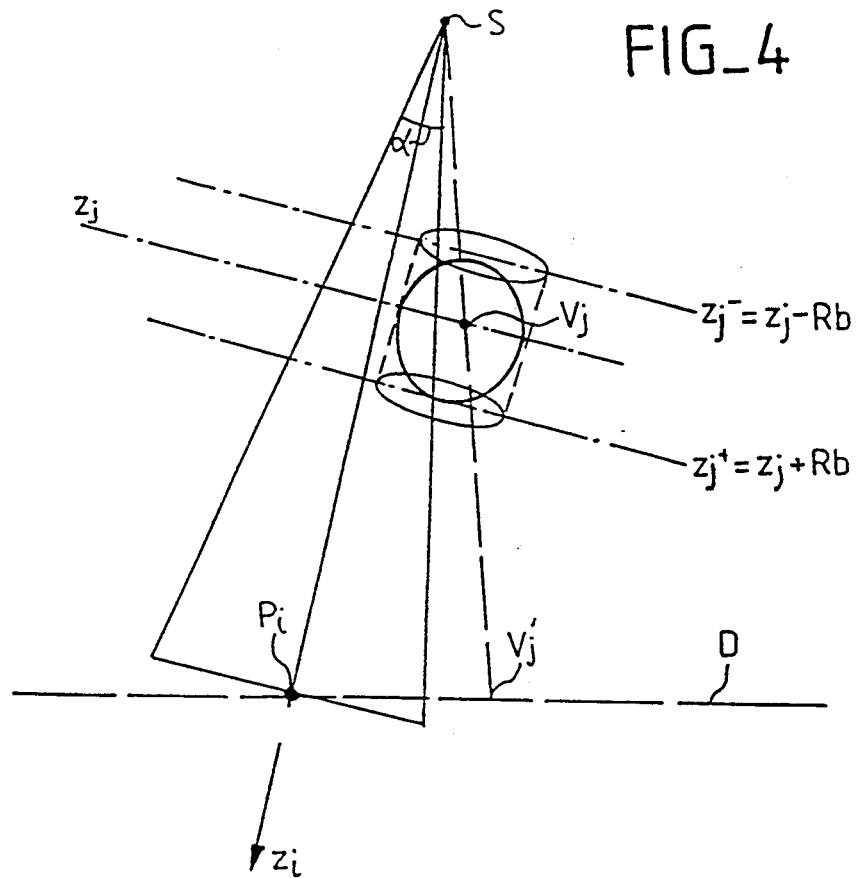
FIG_4
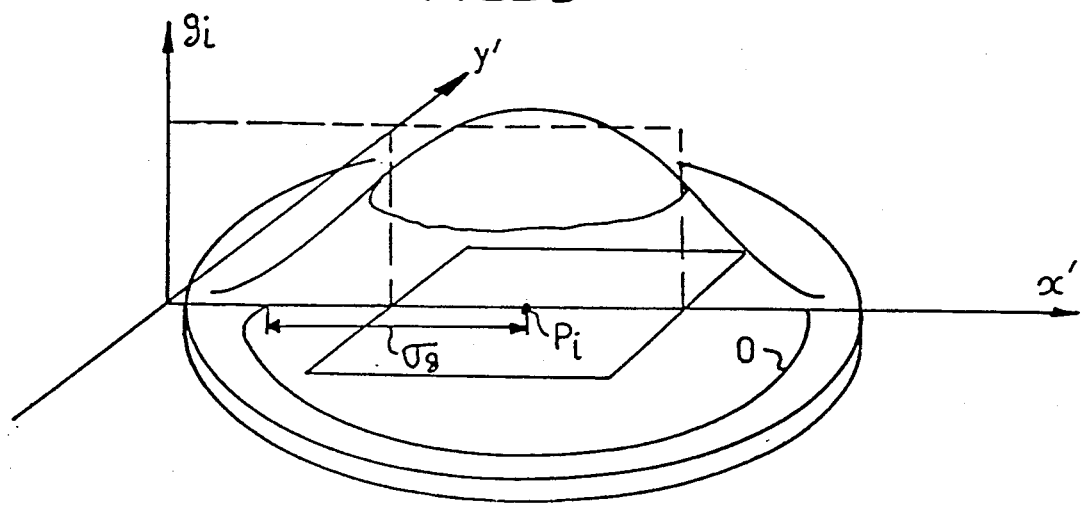
FIG_3

METHOD OF COMPUTATION AND PROCESSING OF THE IMAGE IN CONICAL PROJECTION, OF A SAMPLED THREE-DIMENSIONAL OBJECT

BACKGROUND OF THE INVENTION

1. Field of the Invention

The present invention relates to a method of computation and processing of the image in conical projection, for example in the manner of x-rays, of a three-dimensional (3D) object sampled in volume elements, as well as to a method of three-dimensional reconstruction of an object under study which makes use of this method of computation. The invention finds an application more particularly in an medical field in which the objects to be studied are patients' bodies subjected to a radiological examination. To this end, the invention is essentially concerned with three-dimensional reconstruction. However, it would also be applicable to methods of two-dimensional reconstruction. Similarly, the invention can be employed for visual display of a sampled volume. The object of the invention is to contribute to the production of representative images of 3D objects under study which are more sharply defined and also obtained more rapidly.

2. Description of the Prior Art

It is already known to make two-dimensional (2D) reconstructions of images of cross-sections of objects after (1D) acquisitions in radiological tomodensitometry performed in the cross-section to be imaged. The different generations of tomodensitometers have led to the use, in a third generation, of x-ray fan-beam tomodensitometers in which an x-ray point source illuminates in x-radiation a so-called multidetector comprising a plurality of cells aligned in the plane of the fan beam. The object to be studied is interposed between the x-ray source and the multidetector. Acquisition involves a series of illuminations. From one illumination to another, the assembly consisting of x-ray source and multidetector is rotated about the body to be studied. If s designates the longitudinal coordinate of one cell of the multidetector on said multidetector and if $\theta$ designates the angle of location of the x-ray source-multidetector assembly at the moment of illumination, there is accordingly obtained a series of radiological absorption measurements denoted by $P(\theta,s)$. If one designates as x and y the coordinates of a volume element of the object to be studied, in the cross-section concerned, and if one gives the notation f(x, y) to the linear attenuation function of the x-radiation which passes through the object, one may write:

$$P(\theta, s) = I_0 \exp - \int_X f(x, y) dt \quad 1$$

In this expression, X designates the x-ray which arrives on the cell s when the x-ray tube - multidetector assembly is in the orientation $\theta$. $I_0$ is the incident intensity. This formulation is valid only in cases in which the source is monoenergetic; t is the curvilinear abscissa along the x-ray.

The application of the Radon theories had entailed the need to find the one-dimensional Fourier transform of $P(\theta,s)$ denoted by $p_\theta(u)$. By then finding the two-dimensional Fourier transform of f(x,y) denoted by $\tau(v,w)$, one could be led to identify $p_\theta(u)$ and $\tau(v,w)$ evaluated on the straight line of angle $\theta$. It has been deduced from this that, by means of a two-dimensional Fourier transform reverse to $\tau(v,w)$ and obtained from all the transforms $p_\theta(u)$ (after changing of variables and interpolation), it was possible to compute the distribution of f(x,y) in the cross-section under study from the measurements $P(\theta,s)$.

In practice, one avoids Fourier transforms which lead to excessively long calculations and one makes use of a so-called filtering technique followed by back-projection. Filtering consists in computing the convolution product of the function $P(\theta,s)$ which is representative of the measurements, by means of a filter function q(s). This product is as follows:

$$P(\theta, s) * q(s) = \int_{-\infty}^{+\infty} P(\theta, t) \cdot q(s - t) dt \quad 2$$

In this expression, t is a dummy variable of integration. The choice of the filter (which virtually consists in solving the same problems as those encountered at the time of changes of variables and of interpolation contemplated earlier) governs the quality of the images obtained. In the back-projection operation, the convolved value is assigned to all the volume elements (voxels) of the cross-section of the object under study which is located on the path of an x-ray ($\theta$,s) concerned. In order to deduce the image therefrom, the different convolved values assigned are cumulated for each voxel.

Up to the present time, the acquisition of data and the 3D reconstruction of the structures examined has been carried out by displacing in translational motion the x-ray source - multidetector assembly along the body to be studied and by thus acquiring a plurality of adjacent 2D cross-section images in said body. However, this technique is wholly inadvisable in angiography in which a contrast product is injected in order to obtain contrast in the blood vessels. Injection of this contrast product has a traumatizing effect on the patient, particularly when it is repeated too often. It is for example prohibited to perform 256 injections of contrast product if it is desired to acquire images of 256 adjacent cross-sections in the body. Apart from this prohibition in angiography images, it must be acknowledged that the technique of 2D acquisition and corresponding 2D reconstruction is too time-consuming to be employed for reconstructing 3D objects. In fact, with a mean resolution of 256 points per 256 points in a cross-section image, the acquisition time with a tomodensitometer of current design is of the order of four seconds. The acquisitions which are necessary for 256 cross-sections would accordingly result in an examination time of nearly one half hour. This length of time is much too long to be endured by patients and for the public health system as a whole (general cost).

In theory, it is possible to generalize the Radon method by carrying out 3D acquisitions and by directly performing 3D reconstruction of the objects to be studied. By 3D reconstruction is meant the computation of a numerical volume in which memory cells placed at representative addresses of the voxels of the volume under study contain an item of information corresponding to the distribution of the (radiological) phenomenon being studied in the object. However, the Radon theory makes it necessary to acquire measurements corresponding to integration of the physical characteristics to be imaged in a sub-space assembly, or so-called hyperplane, the dimension of which is smaller by one unit than the dimension of the space under study which is to be reconstructed. In other words, in the case of a 3D space, it is necessary to have measurement results integrated on 2D hyperplanes. In point of fact, radiological acquisition with a point detector can only be an integration of the characteristics on a (1D) straight line: the x-ray. In the event that in practice, the trajectory of the source fails to satisfy the conditions laid down by theory, it will not be possible simply on the basis of a knowledge of the projections along all the straight lines (x-rays) which have served for acquisition, to compute the projections along all the hyperplanes which are necessary for reconstruction. In other words, points will be missing in the Radon space of the measurements. This latter will not be filled in a uniform manner. Artifacts will consequently appear in the resulting 3D reconstructions. Although two-dimensional multidetectors may at present be contemplated (arrangement of silicon photodetectors, use of radiological image intensifier screen), 3D reconstructions by this method must still be relegated to the rank of desirable objectives in view of the imperfection of results to which said method leads when one cannot supply a large number of data, as is the case in vascular applications.

Consideration has been given to a radically different algebraic reconstruction technique based on the following principles. The set of measurements $P(\theta,\tau,s)$ acquired with a plane or concave 2-dimensional multidetector is already known. It is also known that there exists a continuous function $f(x,y,z)$ which is representative of the radiological absorption phenomenon which it is endeavored to represent. It is sought to determine f by reconstruction. In practice, taking into account the fact that all the calculations are performed by treatments of the data-processing type, the knowledge of f at the exit is a sampled knowledge. The new approach has consisted in estimating f by means of a discrete function denoted by $\hat{f}$ and established a priori. For example, $\hat{f}$ can consist at the outset of a numerical volume in which all the voxels are established at one (or at zero). This discrete function is then projected on the multidetector as if the volume under study corresponded exactly to this discrete function. There is thus obtained an estimation designated as $\hat{P}_i(f)$. This may also be written $$\hat{P}_i(f) = H_i \hat{f} \qquad 3$$

In these expressions, i relates to a cell number i of the multidetector and $H_i$ represents the line i of the projection matrix H which corresponds to the cell i. The projection matrix H is independent of the body under study. Said matrix is dependent only on the projection geometry and constitutes the modelization of this latter. One then compares $\hat{P}_i(f)$ (estimated) with $P_i(f)$ (measured). If there is no identity, and it is apparent that there is no identity at the outset, then $\hat{f}$ is corrected. In order to correct, there is performed on the object to be reconstructed a back-projection by the value of the difference between the measured projections and the computed projections. This is written $$\hat{f}_k = \hat{f}_{k-1} + \lambda_k (H_i^* \epsilon_i^k)/|H_i|^2 \qquad 4$$

where $H_i$ is the adjoint operator of $H_i^*$ and where $\epsilon_i^k$ is the difference between the measured and computed projections at the iteration $k-1$.

This set of projections is repeated until the identity of $\hat{P}_i(f)$ and of $P_i(f)$ is sufficient. This technique has been described in "Images reconstruction from projection" by G. T. Herman, Academic Press, 1980.

Moreover, if the projection matrix H is a binary matrix with 1s and 0s, the results are poor. Thus a first solution has consisted in approaching $\hat{P}$ by the curvilinear integral of f taken along a straight line D which connects the source S and the center of each cell on the multidetector. This amounts to considering, however, that each cell is of infinitely small size since, in this manner, neither the real surface of the cell nor the conical character of the projection on said cell is taken into account. Computation of this curvilinear integral may be carried out in several ways. The simplest method consists in approaching the curvilinear integral by a weighted sum of the values of the voxels traversed by the x-ray. There can thus be written:

$$\hat{P}_i(f) = \sum_j h_{ij} \cdot f_j \qquad 5$$

In this formula $f_j$ represents the absorption function in each of the voxels (the sampled volume elements) traversed, and $h_{ij}$ represents the weighting assigned to the value $f_j = f(x_j, y_j, z_j)$ in the case of said voxel when it is traversed by a ray which arrives on the cell i. This weighting can be approached by the length of intersection between the voxel traversed and the x-ray. In this approximation, or so-called method of square pixels as described in the first document cited, the results produced are unfortunately of insufficient quality for the applications which are contemplated.

Another weighting computation has been conceived and is described in "An improved algorithm for reprojecting rays through pixel images" by P. M. Joseph, IEEE-MI, Volume 1, No. 3, Pages 192-196. The basic idea of this other computation is to approach the curvilinear integral of f by a sum relating to the interpolated values of f taken at the intersections of the straight line followed by the x-ray and of horizontal (or vertical) straight lines passing through the centers of the voxels visited or grazed by the x-ray which arrives at the center of the multidetector cell. The values of f at these points of intersection are estimated by means of a linear interpolation between two samples which are located in closest proximity, in the horizontal direction (or in the vertical direction) along the slope of the straight line of the x-ray.

A generalization of the method of square pixels has been proposed by K. M. Hanson and G. W. Wecksung, "Local basis - functions approach to computed tomography", Applied Optics, Vol. 24, No. 23, December 1985, Pages 4028-4039. In this generalization, a continuous function $f(x,y,z)$ is constructed from samples $f(x_j, y_j, z_j)$ and the projection of this continuous function on the cell i of the multidetector is computed. In this generalization, the function f is defined as a linear combination of a set of basis functions $b_j(x,y,z)$ and we may write:

$$f \approx \tilde{f} = \sum_j a_j \cdot b_j(x, y, z) \qquad 6$$

In this formula, $a_j$ represents in the final analysis the description of the function f which is sought, the functions $b_j(x,y,z)$ being known. One usually makes use of basis functions which are local, repetitive and separable.

"They are local" means that the support of each function $b_j$ is small compared with that of f. "They are repetitive" means that each function $b_j$ is deduced by translation from a single function $b(x,y,z)$. This deduction is of the form $$b_j(x,y,z) = b(x-x_j, y-y_j, z-z_j) \qquad 7$$

"They are separable" means finally that there exist three functions $b_x(x)$, $b_y(y)$, and $b_z(z)$ such that:

$$b(x,y,z) = b_x(x) \cdot b_y(y) \cdot b_z(z) \qquad 8$$

It is also worthy of note that, in the event that $b_x$ is equal to $b_y$ and to $b_z$ and that these functions are equal to a square-wave function, the so-called method of square pixels is again encountered. It may be stated that the generalization obtained by the method of basis functions makes it possible to revert to the other methods mentioned earlier but by giving them a more explicit mathematical foundation, with the result that the operations performed can be more readily understood. In practice, the best results are obtained with basis functions which are B-splines, cardinal sines, Hamming functions, or preferably Gaussian functions. With such basis functions, the results obtained are of better quality than those produced by the Joseph method, although of course at the cost of a longer computation time.

The operation which consists in projecting the estimation $\hat{f}$ of f actually consists in computing $$\hat{P}_i(f) = \sum_j a_j \int\int\int g_i(x, y, z) \cdot b_j(x, y, z) dx dy dz \qquad 9$$

In this expression, $g_i$ designates a weighting function having a zero value (or a very small value) outside the angular sector formed by the source s and the cell i. The functions $g_i$ are representative of the conical support for illumination of the cell i. We may in fact write $$h_{ij} = \int\int\int g_i(x,y,z) \cdot b_j(x,y,z) \, dx \, dy \, dz \qquad 10$$

and the computation of p is then reduced to calculation of all the weights $h_{ij}$. Each weight $h_{ij}$ represents the contribution of the basis function $b_j$ to the projection of the object on the cell i.

Starting with a knowledge of samples $f_j$ of a function f of three variables, the aim of the invention is to permit numerical computation of the projection of f on a detecting cell i while ensuring both good quality of the result obtained and very short computation times. These two criteria (quality and speed) are essential in the reconstruction of a function $f(x,y,z)$ from a set of 2D conical projections by means of algebraic techniques of reconstruction. Whereas it was not possible to ensure the desired quality and speed by means of the methods of projection of the prior art, the present invention makes it possible to do so.

SUMMARY OF THE INVENTION

Accordingly, the invention is directed to a method of computation of the image of a three-dimensional object sampled in volume elements, said image being illuminated in conical projection, for example in the manner of x-rays, in which one decomposes the sampled three-dimensional object on a space of Gaussian basis functions, one computes in the case of each projected image element contributions of the basis functions corresponding to the volume elements which are projected on the image element considered, each contribution being equal to the integral of the product of the basis function relative to a volume element and of a function which is representative of a support for illumination of the image element considered, the method being distinguished by the fact that the functions which are representative of the support are replaced by Gaussian weighting functions.

The invention is also concerned with a method of three-dimensional reconstruction of an object under study, which utilizes said method of computation iteratively in order to find iteratively the function f to be reconstructed, starting from a sampled discrete function which is a priori representative of the object to be reconstructed. In this case the image element is identified with one cell of a 2D multidetector.

BRIEF DESCRIPTION OF THE DRAWINGS

FIG. 1 is a schematic presentation of an x-ray illumination source and of a multidetector.

FIG. 2 is a geometrical diagram presenting different reference frames which can be employed for expressing the coordinates of the detecting cells and which lead to simplified calculations.

FIG. 3 is a schematic presentation (two-dimensional for the sake of simplicity) of a weighting function (three-dimensional) in accordance with the invention.

FIG. 4 shows geometrical characteristics which relate to the projections and justify the simplified calculations adopted.

DETAILED DESCRIPTION OF THE INVENTION

FIG. 1 illustrates a source S of x-rays which illuminates a body C in such a manner as to ensure that detecting cells i of a multidetector D measure the attenuation of said illumination after passing through the body C. It will be assumed in the explanation which now follows that the multidetector employed is a plane (just as the external surface of a radiological luminance intensifier screen can be assimilated with a plane). However, the invention could readily be extrapolated to the use of a concave multidetector in the same manner as a silicon multidetector provided with photodetecting cells. A concave multidetector of this type is at all points of its surface perpendicular to the conical x-radiation which illuminates it.

FIG. 2 shows three direct orthonormal reference frames. A first orthonormal reference frame x,y,z is integral with the body C. For one position of the assembly consisting of source S and multidetector D, it may also be considered as integral with the source S. The detector D which is assumed to be flat is characterized by a central point designated as P which is the orthogonal projection of the source S on the plane of said multidetector. A reference frame x',y',z' attached to the detector D is accordingly characterized by the fact that z' is collinear and in the same direction as SP whilst x' and y', which for the sake of simplicity are oriented along the orthogonal edges of the detector D, form with z' a direct orthonormal reference frame. The cell i is assumed to be a square of the plane of the detector D and is attached to a direct orthonormal reference frame $x_i$, $y_i$, $z_i$ such that $z_i$ is collinear with $SP_i$ ($P_i$ being the center of the cell i). The orthonormal vectors $x_i$ and $y_i$ are orthogonal to $z_i$, the vector $x_i$ being contained in the plane of the detector D. The ray $SP_i$ is perpendicular to a plane $\pi_i$ containing the vector $x_i$.

In accordance with the foregoing description, the invention utilizes the general principle of decomposition of f into basis functions. The basis functions chosen are local, separable, repetitive and Gaussian basis functions. We may consequently set:

$$f(x, y, z) \approx \tilde{f}(x, y, z) = \sum_j a_j b_j(x, y, z) \qquad 11$$

with $$b_j(x, y, z) = b_x(x - x_j) \cdot b_y(y - y_j) \cdot b_z(z - z_j)$$

The assumption is made here that the sample voxels are distributed on a lattice having a resolution which is the same in the three directions of the space. If $\delta x$, $\delta y$ and $\delta z$ designate the sampling pitches along the three axes x, y and z, we may then write $$\delta_x = \delta_y = \delta_z \qquad 12a$$

There are then chosen Gaussian basis functions having the general form:

$$b_x(u) = \delta_x \cdot G_{\sigma b}(u) \qquad 12b$$

In this expression $G_{94\ b}(u)$ designates a truncated Gaussian function having a standard deviation $\sigma_b$ such that:

$$G_{94\ b}(u) = (1/\sqrt{2\pi}\sigma_b) exp(-u^2/2\sigma_b^2) \text{ if } |u| \leq R_b \qquad 13$$

$$G_{94\ b}(u) = 0 \text{ if } |u| > R_b$$

In this expression, the value of the radius $R_b$ of truncation of the truncated Gaussian function as well as the standard deviation $\sigma_b$ can be chosen by the user. The Gaussian functions are truncated because computations are necessarily limited in a digital computer. But this truncation has no appreciable effect on the validity of computations. Good practical results have been obtained by taking Gaussian functions having a width at mid-height which is equal to $\sigma x$, namely Gaussian functions in which the standard deviation is given by $$\sigma_b = \delta x / 2Ln(2\sqrt{2}) \qquad 14$$

since there is a ratio $2Ln(2\sqrt{2})$ between the width at mid-height and the standard deviation of a Gaussian function. In this expression, Ln represents the Neperian logarithm.

Similarly, a satisfactory empirical value for the radius $R_b$ has been $R_b = 3\delta x/2$. The term $\delta x$, $\delta y$ and $\delta z$ introduced is a standardization term which ensures that, in the case in which f is a constant function (that is to say such that $f(x,y,z) = a$), the coefficients $a_j$ are constant and very little different from a. This standardization makes it possible if necessary to simplify the transition between the samples $f_j$ and the coefficients $a_j$ of the Gaussian functions (by choosing in an approximate manner $a_j = f_j$). However, this standardization is not essential in the present invention.

In a known manner, the weighting function $g_i$ must be nonnegative within the polyhedron having a vertex S and having the cell i as its base and practically zero outside this polyhedron. Furthermore, within the polyhedron, the weight assigned to each of the planes $z_i$ (planes at right angles to the axis $FP_i$) must be the same since each of these planes is intersected by the same number of rays emanating from the source. This constraint results in the fact that the integral $$\int\int g_i(x_k, y_k, z_k)\, dx_k\, dy_k \qquad 15$$

evaluated in the reference frame $x_i, y_i, z_i$ attached to the cell i must be independent of $z_k$.

In order to satisfy these two conditions, special weighting functions $j_i$ have been adopted in accordance with the invention. These functions are Gaussian. Preferably, they are even truncated Gaussian functions. In fact, in each plane $z_i$ = constant, these functions are 2D Gaussian functions. In the 3D space, however, they are not Gaussian functions. It can nevertheless be stated that their mathematical formulation calls for the use of Gaussian functions.

FIG. 3 is a schematic presentation of the restriction of one of these weighting functions in the plane of the detector D. To within a very slight approximation, this restriction is a truncated 2D Gaussian function. The center of this Gaussian function is $P_i$, its standard deviation is $\sigma_g$ and its radius of truncation is $R_g$. The standard deviation $\sigma g$ and the radius $R_g$ can be chosen by the user. Rather than adopting a position in the plane of the detector, it may prove more convenient in order to give the mathematical expression of $g_i$ to adopt a position in the reference frame of the cell $(x_i, y_i, z_i)$. If 0 designates the circle, in the detector plane, having a center $P_i$ and a radius $\sigma_g$, it may be postulated that the projection in a direction $z_i$ of said circle on the plane $\pi_i$ attached to the cell i and defined earlier is an ellipse. This ellipse has axes oriented along $x_i$ and $y_i$. Bearing in mind the fact that $x_i$ is common to the plane of the detector D and to the plane $\pi_i$ and by ensuring by measurement that the radius $SP_i$ is inclined with respect to the radius SP at an angle $\tau$ (FIG. 2), we may write:

$$\sigma_{gx} = \sigma_g$$

$$\sigma_{gy} = \sigma_g \cos(\tau) \qquad 16$$

We may then choose for $g_i$ a separable expression of the following form:

$$g_i(x_k, y_k, z_k) = G_{\sigma gx(zk)}(x_k) \cdot G_{\sigma gy(zk)}(y_k) \qquad 17$$

In this expression $G_\sigma(u)$ is a truncated 1D Gaussian function such that $$G_{\sigma gx(zk)}(x_k) = (1/\sqrt{2\pi}\sigma_{gx(zk)}) exp(-x_k^2/2\sigma_{gx(zk)}) \qquad 18$$

if $|x_k| \leq R_{gx(zk)}$ and such that $G_{\sigma gx(zk)}(x_k) = 0$
if $|x_k| > R_{gx(zk)}$ One defines $G_{\sigma gy(zk)}$ in the same manner. In these expressions, $R_{gx}$ is the radius of truncation on the axis $x_i$ (likewise $R_{gy}$ is the radius of truncation on the axis $y_i$) The Gaussian functions are in fact parameterized by $z_k$ since the standard deviations clearly depend on the altitude of the basis function thus weighted with respect to the source S by reason of the conical character of the projection. For this reason, the standard deviations $\sigma_{gx}(z_k)$ and $\sigma_{gy}(z_k)$ are defined by $$\sigma_{gx}(z_k) = \sigma_{gx} \cdot z_k / SP_i$$

$$\sigma_{gy}(z_k) = \sigma_{gy} \cdot y_k / SP_i \qquad 19$$

$SP_i/z_k$ will be designated as the ratio of enlargement of the projection on the plane $\pi_i$ parallel to $z_i$. We may write $$FMAG(z_k) = SP_i/z_k \qquad 20$$

Similarly, it will be possible to define the truncation radii as a function of FMAG as follows:

$$R_{gx}(z_k) = R_g/FMAG(z_k)$$

and $$R_{gy}(z_k) = R_g \cos \tau / FMAG(z_k) \qquad 21$$

The function $g_i$ thus defined has the following properties. The restriction of $g_i$ in the plane $\pi_i$ is, by definition, a truncated 2D Gaussian function having a standard deviation $\sigma_{gx}$ along $x_i$ and a standard deviation $\sigma_{gy}$ along $y_i$. The support of $g_i$ is a cone having a vertex S, an axis $SP_i$, and an elliptical base (in the plane $\pi_i$). The restriction of $g_i$ in the detector plane is not different from a truncated 2D Gaussian function having a standard deviation $\sigma_g$ (along $x'$ or $y'$). The support of this restriction is little different from the circle having a center $P_i$ and a radius $R_g$. The support for said restriction of $g_i$ is not a perfect circle since the source S is not in fact at infinity. Indeed, if the source S were at infinity and if its projection in the plane $\pi_i$ were actually elliptical, its projection in the plane of the detector would be strictly a circle. Since the projection is conical, the projected circle is slightly deformed : the resultant error is of the second order and may be disregarded. Furthermore, the function $g_i$ thus chosen satisfies the requirement whereby $$\iint g_i(x_k, y_k, z_k) \, dx_k dy_k \qquad 22$$

is independent of $z_i$. In fact, this double sum can be written:

$$\iint G_{\sigma gx(zk)}(x_k) \cdot G_{\sigma gy(zk)}(y_k) dx_k dy_k \approx 1 \qquad 23$$

which is a constant. The equality is not exact since the Gaussian functions employed are truncated instead of being pure Gaussians. There is finally chosen in practice, as in the case of the basis functions, a standard deviation of the weighting function such that the width at mid-height of the Gaussian functions is equal to the width of a voxel (in the attached reference frame and at the location of the detecting cell). Similarly, there is chosen a radius of truncation Rg which is equal to three halves of this width. In conclusion, we may write that the expression obtained for the estimation of the projection $\hat{P}_i(f)$ is as follows:

$$\hat{P}_i(f) = \delta_x \delta_y \delta_z \sum_j a_j \iiint G_{\sigma b}(x_j - x_k) \cdot G_{\sigma b}(y_j - y_k) \cdot G_{\sigma b}(z_j - z_k) \cdot A \cdot dx_k dy_k dz_k \qquad 24$$

where $$A = G_{\sigma gx(zk)}(x_k) \cdot G_{\sigma gy(zk)}(y_k)$$

In the foregoing expression, it will be shown that the variable $z_k$ can be eliminated. This is possible at the cost of an approximation. The assumption is made, as amply verified in the applications mentioned above, that the side $\Gamma x'$ of a detecting cell is very small in comparison with the distances SP or $SP_i$. Under the conditions in which the invention is at present employed, we have, for example, $\delta x'$ substantially equal to 0.8 mm and SP substantially equal to 1200 mm. On this assumption, the angle $\alpha$ at the vertex of the cone corresponding to the support of $g_i$ is very small. The numerical values which we have just given result in $\alpha \approx 0.04°$.

Consideration is then given to a basis function 3D $b_j$ and one finds out whether its support has an empty intersection with the support cone of $g_i$. Should this intersection be empty, its contribution to the projection $\hat{P}_i(f)$ would be zero. Should this not be the case, the intersection is bounded by two parallel half-planes such that $$z_i = z_j^+ \text{ or } z_j^+ = z_j + R_b$$

$$z_i = z_j \text{ or } z_j^- = z_j - R_b \qquad 25$$

In this expression, $z_j$ designates the level, in the reference cell ($x_i, y_i$ and $z_i$) of the point $V_j$ on which the basis function $b_j$ is centered. FIG. 4 shows the local domain of definition of the function $b_j$ which is limited about the point $V_j$. This domain is a circle limited by the radius $R_b$ ($R_b$ being the radius of truncation of the Gaussian function which defines $b_j$). FIG. 4 illustrates the integration proposed by formula 11. As and when the local basis functions are taken into consideration, one evaluates their intersection with a portion of the support of the weighting function of the detecting cell considered. This portion of the support is normally an elliptical cone frustum, the largest base of which is established by the altitude $z_j - R_b$ and the smallest base of which is established by the altitude $z_j + R_b$. In the present invention, taking account of the fact that on the one hand $\alpha$ is very small and that on the other hand $R_b$ is also small (on the assumption of "local" bases), it has become apparent that the cone frustum could be approached in the vicinity of $g_j$ by a cylinder element having an axis $SP_i$. In other words, it is considered that, where $z_k$ belongs to an interval ($z_j^-, z_j^+$), we may write $$\sigma_{gx}(z_k) \approx \sigma_{gx}(z_j) \qquad 26$$

whence $\sigma_{gx}(z_k) \approx \sigma_g/FMAG(z_j)$
and $\sigma_{gy}(z_k) \approx \sigma_{gy}(z_j)$
whence $\sigma_{gy}(z_k) \approx \sigma_g \cos(\tau)/FMAG(z_j)$ In this expression, k is attached to the weighting function whereas j is attached to the basis function. The advantage offered by the last expression lies in the fact that $\sigma_{gy}(z_k)$ is now independent of $z_k$ since, by approximation, it is now dependent only on $z_j$. Under these conditions, calculation of the approximation $\hat{P}(f)$ of Formula 24 is simplified and becomes $$\hat{P}_i(f) = \delta x \delta y \delta z \sum_j a_j \iint G_{\sigma b}(x_j - x_k) \cdot G_{\sigma b}(y_j - y_k) \cdot A \cdot dx_k dy_k \qquad 27$$

since the functions are separable and the integrals are therefore separable, and since $$\int_{-\infty}^{+\infty} G_{\sigma b}(z_j - z_k) dz_k \approx 1 \qquad 28$$

By separating the integral on $x_k$ and the integral on $y_k$, we may write:

$$\hat{P}_i(f) \approx \delta x \delta y \delta z \sum_j a_j \int G_{\sigma b}(x_j - x_k) \cdot G_{\sigma gx(zk)}(x_k) dx_k \cdot \quad 29$$
$$\int G_{\sigma b}(y_j - y_k) \cdot G_{\sigma gx(zk)}(y_k) dy_k$$

In point of fact, in the case of a given value of i, each of the two integrals of this last expression can be interpreted as a convolution product of two centered Gaussian functions. The convolution product of two centered Gaussian functions is known to be a Gaussian function which is also centered, the variance of which is equal to the sum of the two variances of the initial Gaussian functions. This accordingly leads to the particularly simple expression, after computation, $$G_{\sigma b}(x_j - x_k) \cdot G_{\sigma gx(zk)}(x_k) dx_k \approx (1/\sqrt{2} \, \pi \sigma_x) \exp(-x_j^2/2\sigma_x^2) \quad 30$$

and $$G_{\sigma b}(y_j - y_k) \cdot G_{\sigma gy(zk)}(y_k) dy_k \approx (1/\sqrt{2} \, \pi \sigma_y) \exp(-y_j^2/2\sigma_y^2)$$

whence in the case of $\hat{P}_i(f)$:

$$\hat{P}_i(f) \approx \delta x \delta y \delta z \sum_j a_j (1/2\pi\sigma_x\sigma_y) \exp(-x_j^2/2\sigma_x^2) \cdot \exp(-y_j^2/2\sigma_y^2) \quad 25$$

The expression of the variances $\sigma_x^2$ and $\sigma_y^2$ is as follows (sum of the variances):

$$\sigma_x^2 = \sigma_b^2 + \sigma_{gx}(z_j)^2$$

$$\sigma_y^2 = \sigma_b^2 + \sigma_{gy}(z_j)^2 \quad 31$$

It should be observed, however, that these relations are only approximations insofar as the functions employed are in fact truncated Gaussians. The last relation has the considerable advantage of being divested of any integral calculus. Consequently, with the approximations which have thus far been justified in the present invention, it will be possible to calculate the projection of the sampled function by means of a very simple calculation.

In these expressions, $\sigma_{gx}$ and $\sigma_{gy}$ can be replaced by their values as a function of FMAG. This last expression is written:

$$\sigma_x^2 = \sigma_b^2 + \sigma_g^2 / FMAG(z_j)^2$$

$$\sigma_y^2 = \sigma_b^2 + \sigma_g^2 \cos^2(\tau) / FMAG(z_j)^2 \quad 32$$

The values $x_j$ and $y_j$ which appear in the Equation 30 are, in the case of each cell i, coordinates of the voxels relating to the cell reference frame i.

In order to simplify the projection algorithm f, it is more advantageous to employ only coordinates relating to the detector reference frame. To this end, it is possible to introduce a second direct orthonormal reference frame of the detector plane, denoted by $x_i, y_i'$ and by $z_i'$. The first vector of this reference frame is the same as the first vector of the cell reference frame i. This is possible since the vector $x_i$ also belongs to the detector plane as mentioned earlier. The vector $z_i'$ is parallel to the vector $z'$ of the reference frame attached to the detector plane. The vector $y_i'$ is deduced from these vectors $x_i$ and $z_i'$ as being the third vector of a direct reference frame. It can be shown that the vectors $x_i$ and $y_i'$ are deduced from the vectors $x'$ and $y'$ by a plane rotation through an angle $\theta$ (FIG. 2) in which $\theta$ is the angle between the vector $y'$ and the axis $PP_i'$. However, in practice, for reasons related to the structure of the projection algorithm described, the angle employed is not the angle $\theta$ but an approximate value $\theta'$. This angle $\theta'$ is defined as the angle between the axis $y'$ and the axis $PV_j'$, where $V_j'$ is the projection of $V_j$ on the detector. This point appears in FIG. 2 as well as in FIG. 4. This approximation is justified insofar as $V_j$ will be taken into consideration only when its projection comes close to $P_i$, by reason of the local character of the weighting function. It will therefore be possible in the equations to substitute $\theta'$ for $\theta$ without entailing any excessive error of reconstruction as a result of this approximation.

The values $x_j$ and $y_j$ which appear in the Equation 30 are, within the cell reference frame i, the abscissa and the ordinate of the center $V_j$ of the basis function $b_j$. Let us express the coordinates $x_j$ and $y_j$ as a function of the coordinates in the plane reference frame $(x_i, y_i)$ of the vector $P_i V_j$. The coordinates of $P_i V_j'$ are designated as $(x'_j, y'_j)$. It can be observed that the vector $P_i V_j'$ is equal to the projection of the vector of coordinates $(x_j, y_j)$ on the plane of the detector and in the direction $SP_i$. It may then be deduced that $$x'_j = x_j FMAG(z_j)$$

$$y'_j \approx y_j FMAG(z_j) / \cos(\tau) \quad 33$$

And this accordingly leads to the final formula which transforms the equation:

$$\hat{P}_i(f) \approx \frac{\delta x \delta y \delta z}{2\pi} \sum_j a_j \frac{FMAG(z_j)^2}{\sigma_{x'}\sigma_{y'}\cos(\tau)} \cdot \exp\frac{-x'_j{}^2}{2\sigma_{x'}^2} \cdot \exp\frac{-y'_j{}^2}{2\sigma_{y'}^2} \quad 34$$

by setting $$\sigma_{x'}^2 = \sigma_b^2 \cdot FMAG(z_j)^2 + \sigma_g^2$$

and $$\sigma_{y'}^2 = \sigma_b^2 \cdot FMAG(z_j)^2/\cos(\tau) + \sigma_g^2$$

The advantage of exponential functions is that they replace integral calculus by functions which can be computed beforehand and tabulated. This results in a saving of time.

The results acquired can be summarized by giving a general description of the algorithm proposed for computation of the projection of $\hat{f}$. Samples $f_j$ will normally be available for each value j of the function $\hat{f}$. They will be projected by means of the projection matrix and an estimation of the projection $P_i(\hat{f})$ will be obtained for every value of i. It is this estimation which will be compared with the values actually measured in order to deduce therefrom a new sampling value of f by back projection of the differences (or residues) so as to reiterate the entire calculation until the estimation progressively comes as close as possible to the function which is sought. The algorithm therefore involves the following steps:

one proceeds from the base of the samples to the base of the Gaussian basis functions. This actually consists in calculating all the coefficients $a_j$ when $f_j$ is known. At the outset, taking into account the fact that the basis functions $b_j$ have a bounded support, it will be possible to simplify this operation while pointing out that the Gaussian functions employed have mid-height widths of the same order as the size of the voxels by choosing $a_{j0} \approx f_{j0}$ in a first step of the method. This relation is approximate but is sufficient in practice;

one initializes all the $\hat{P}_i(f)$ at zero, and for each value of j one computes the coordinates, in the detector reference frame, of the point $V'_j$ which is a projection of the center $V_j$ of the basis function on the detector;

one deduces therefrom $\theta' = $ the angle $(y', PV'_j)$;

one computes the function $FMAG(z_j)$ in the case of said basis function located at an altitude $z_j$;

one also computes $\tau$ which is the angle formed between SP and $SP_i$;

one then computes $\sigma_{x'}$ and $\sigma_{y'}$;

and, in the case of each of the pixels $(x_i', y_i')$ of the detector plane which belongs to the projection of the support of the basis function $b_j$ on the detector;

one computes $x_j'$ and $y_j'$;

one computes $h_{ij}$ which is the contribution of the basis function $b_j$ to the pixel $x_i'$, $y_i'$;

and one increments $\hat{P}_i(f) = \hat{P}_i(f) + h_{ij} \cdot f_j$.

It will be understood that the algorithm which has been invented need not serve only to reconstruct the function f which is sought. When a correctly sampled function f is known, this algorithm can make it possible to propose images of said function in conical projection in a principal direction SP to be defined. Accordingly, the advantage of the invention is to provide an image without artifact, this image being obtained more rapidly than in the prior art.

The fact of choosing a Gaussian weighting function having a standard deviation (with all the simplifications presented) which is also a function of the altitude of the basis function normally leads to weighting which is naturally adapted to the conical nature of the illumination. In this way, artifacts are reduced and reconstruction is accelerated.

The invention is clearly concerned with all types of processing of images or computed reconstructions. Such processing operations include in particular visual display of reconstructed structures or of computed images.

What is claimed is:

1. A method for reconstructing a 3D image of a three-dimensional object, wherein said 3D image is sampled in volume elements after said object is irradiated by conical projections of X-rays for obtaining radiological images thereof, said method comprising the steps of:

a) irradiating said object by conical projections of X-rays;

b) decomposing said 3D image in a space represented by Gaussian basis functions ($b_j$);

c) generating projected images, each comprising image elements, by calculating contributions ($a_j$) of said Gaussian basis functions, wherein said contributions correspond to specified volume elements which are projected by conical illumination onto a specified image element, and wherein each of said contributions is equal to an integration of a product of a Gaussian basis function relative to one of said specified volume elements and a Gaussian weighting function ($g_i$) representative of a support for illumination of the specified image element;

d) comparing said generated images with said radiological images obtained from the irradiation of said object with said conical projections of X-rays; and e) reconstructing said 3D image from said generated images based on a comparison result obtained in step c);

f) displaying said reconstructed image.

2. A method according to claim 1, wherein said Gaussian weighting functions have standard deviations in directions perpendicular to a direction said 3D image is illuminated in, the values of said standard deviations being a function of a position of one of said specified volume elements in relation to an illumination ray.

3. A method according to claim 2, wherein the values of said standard deviations are linear functions of said position of said specified volume element.

4. A method according to claim 2, wherein the values of said standard deviations are constant in a local vicinity of said specified volume element.

5. A method according to claim 1, further comprising the step of truncating said Gaussian weighting functions.

6. A method according to claim 5, wherein said truncated Gaussian weighting functions have truncated radii ($R_g$) which are substantially equal to three halves of a geometrical dimension of a sample within a sampled volume element.

7. A method according to claim 1, wherein repetitive, separable and local Gaussian basis functions are used, and calculation of the contributions is performed by computing exponential functions of a function of the coordinates ($x_j'$ $y_j'$) of a geometrical projection of a center ($v_j$) of a support of the basis functions in order to compute said contributions ($a_j$).

8. A method according to claim 1, wherein, in order to compute the contribution of the Gaussian basis functions, the following formula is applied:

$$\hat{P}(f) \approx \frac{\delta_x \delta_y \delta_z}{2\pi} \sum_j a_j \frac{FMAG(z_j^2)}{\sigma_{x'}\sigma_{y'}\cos(\tau)} \cdot \exp\frac{-x_j^2}{2\sigma_{x'}^2} \cdot \exp\frac{-y_j^2}{2\sigma_{y'}^2}$$

by setting $$\sigma_{x'}^2 = \sigma_b^2 FMAG(z_j)^2 + \sigma_g^2$$

and $$\sigma_{y'}^2 = \sigma_b^2 FMAG(z_j)^2/\cos(\tau) + \sigma_g^2$$

in which:

FMAG represents a coefficient of enlargement which takes into account the conical nature of the projection by means of the coordinate $z_j$;

$\sigma_b$ and $\sigma_g$ are the standard deviations of the basis functions and weighting functions respectively;

$\delta_x$, $\delta_y$ and $\delta_z$ are the geometrical dimensions of the sample;

and $\tau$ measures the inclination of the projection onto a specified image element with respect to a normal projection.

9. A method according to claim 1, wherein a mid-height width of said Gaussian weighting function, substantially equal to a geometrical dimension of a sample within the sampled volume element, is used.

10. A method for three-dimensional reconstruction of an image of an object under study, said method comprising the steps of:

(a) irradiating said object under study by conical projections of rays;

(b) estimating the image by a sampled function;

(c) projecting the estimated sampled function;

(d) comparing the projected estimated sampled function with measurements obtained from a projection study of the object; and (e) repeating steps (b) - (d) until a satisfactory comparison is reached,
(e) displaying the reconstructed image;
wherein in order to project said estimated sampled function, step (c) comprises the further steps of:
(c1) decomposing a sampled three-dimensional image in a space of Gaussian basis functions;
(c2) computing for each of a plurality of image elements of the projected image of the estimated sampled function, contributions of the Gaussian basis functions corresponding to a plurality of volume elements of said sampled three-dimensional projected image elements, each contribution being equal to an integration of a product of the basis function relative to one of said volume elements and a Gaussian weighting function ($g_i$) representative of a support for illumination of the image element considered.

* * * * *